United States Patent Office 3,155,744
Patented Nov. 3, 1964

3,155,744
ADHESIONABLE VINYL-MODIFIED POLYOLEFINS
AND METHODS FOR PRODUCING SAME
Lloyd J. Forrestal, Rowayton, and Armand F. Lewis, Norwalk, Conn., assignors to American Cyanamid Company, New York, N.Y., a corporation of Maine
No Drawing. Filed Dec. 23, 1960, Ser. No. 77,803
1 Claim. (Cl. 260—878)

This invention relates to improved adhesionable polymers and to methods for preparing and utilizing the same. More particularly, it relates to improved, modified, moldable, extrudable polyolefin polymers prepared by the graft polymerization of vinyl monomers hereinafter defined, onto irradiated polyolefin polymers. Still more particularly, the invention is concerned with the utilization of the latter modified polymers as adhesives possessing exceptionally outstanding properties.

It is known that polyolefin polymers can be modified by grafting polymerizable monomers thereto. A variety of monomers may be mentioned, as for instance, styrene, methyl methacrylate, acrylonitrile and acrylamide. However, such modified polymers suffer the serious drawback that, to obtain any acceptable degree of adhesion, the modified polymers are prepared by grafting the monomers on preformed polyolefin film, sheet or fiber. Unfortunately, resultant modified polymers are found to be unsuitable for subsequent molding or extrusion processes, since they result in highly crosslinked, non-moldable, non-extrudable products. If modified polyolefin products, which are moldable and extrudable, could be developed, such would be highly desirable.

It is, therefore, a principal object of the present invention to provide a moldable and extrudable irradiated polyolefin polymer to which a polymerizable monomer has been grafted. It is a further object of the invention to provide either as an adhesive or as an adhesionable polymer a substantially modified, moldable and extrudable polyolefin polymer. Other objects of the present invention will become apparent from a reading of the ensuing description.

To this end, a vinyl monomer which normally homopolymerizes to a low degree of polymerization is caused to react with an irradiated polyolefin. Advantageously, the reaction occurs either when utilizing previously irradiated polyolefins, or when the polyolefin and the vinyl monomer are simultaneously irradiated. Thus, the polyolefin and the vinyl monomer react to form a moldable and extrudable polymer which is not highly crosslinked. It is further surprisingly found that the reaction herein, which involves the grafting of a monomer to a polymer, contemplates solely a low degree of crosslink-polymerization. Contrary to expectations, grafting of the monomer to the polymer does not result in additional crosslinking. However, the process does result in placing side substituents or chains onto the polyolefin. These chains do not cause the resultant modified polymer to become non-moldable and non-extrudable, indicating that additional crosslinking did not occur during the aforementioned reaction. Resultant modified polymer is found to increase in weight from about 0.1% to about 20.0%.

Illustrative vinyl monomers, which are within the purview of the present invention, are:

(1) Bis-(2-chloroethyl) vinyl phosphonate, $$[(ClCH_2CH_2O)_2POCH=CH_2]$$

(2) Vinyl phosphonic acid, $$[CH_2=CHPO(OH)_2]$$

(3) Paravinyl phenyl boronic acid,

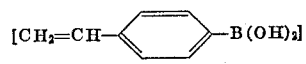

(4) Paravinyl benzyl sulfonic acid,

and alkali metal salts thereof. Exemplary of such alkali metals are sodium, potassium and lithium.

It is generally a good practice to utilize from about 0.5 to 10.0 parts by weight of the monomer per part of polymer. Preferably, a range from about 2 to about 5 parts of monomer per part of polymer is used for optimum operation.

Contemplated polyolefins include either polyethylenes or polypropylenes of high average molecular weight in the range of from about 20,000 to 250,000. The polyolefin may be in the form of discrete particles, films, strips or fibers. Grafting of the monomer onto the polyolefin may concurrently take place in the presence of irradiation. Alternatively, and preferably, the polyolefin can be irradiated prior to vinyl monomer reaction.

Radiation utilized in accordance with the process of the instant invention can be of several types. One type of radiation is particulate radiation, such as α-particles and β-radiation (that is, electrons), obtained from radioactive nuclei or high-energy electrons from the machine sources. Another type of radiation contemplated herein is electro-magnetic radiation, such as gamma-rays and X-rays. However, a preferred source of radiation is a beam of high-energy electrons (e.g., from about 0.5–3 million electron-volt electrons).

In general, it has been found that for ionizing radiation a total dose from 10,000 to 30,000,000 rads can be effectively tolerated. A rad is defined as equal to 100 ergs of actual energy absorbed per gram of material treated. Optimum results, however, are obtained when from 75,000 to 1,200,000 rads are absorbed.

Reaction between the irradiated polymer and the monomer occurs within ten to fifty hours. Usually, from twelve to about twenty hours are sufficient and is a good operating practice.

The following examples will serve to further illustrate the invention. It is understood, they are to be taken as illustrative only and are not to be taken as limitative thereof. All parts are by weight, unless otherwise noted.

EXAMPLE 1

3.8 parts of powdered polypropylene are irradiated under a reduced pressure of about 0.001 mm. Hg. When a dose of about one million rads, obtained from 250 kilovolt peak (kvp.) X-rays utilizing a General Electric Maxitron unit, is imparted to be polypropylene, the radiation is terminated. The so-irradiated polymer is next contacted with 13 parts of bis-(2-chloroethyl) vinyl phosphonate for about twelve hours. The treated polymer is washed with ethanol to remove any traces of alcoholic soluble unreacted monomer. The washed polymer is placed in a vacuum oven and dried.

Resultant polymer is found to increase 2.8% in weight indicating reaction between the monomer and polymer.

EXAMPLE 2

Example 1 is repeated in every material detail except that a sheet (1 mil thick) polypropylene is substituted for the powdered polypropylene and the contact time between the irradiated polymer and reactive monomer is forty-eight hours rather than twelve hours.

A 1% increase in the weight of the film is found.

EXAMPLE 3

3.0 parts of polyethylene are irradiated under a reduced pressure of 0.001 mm. Hg with three (3) million electron volt (m.e.v.) electrons from a Van de Graaff generator. After receiving a dose of about three million rads, the irradiation is discontinued and 13 parts of bis-(2-chloroethyl) vinyl phosphonate are brought into contact with the irradiated polymer for forty-eight hours. The polymer is further treated as in Example 1 above to remove traces of the monomer and its homopolymer.

The resultant polymer is found to increase 3.0% in weight indicating polymer and monomer reaction.

EXAMPLE 4

Substituting a 10% aqueous solution of vinylphosphonic acid for the phosphonate in the procedure of Example 1 above, a polymer is obtained which increased 3.5% in weight when repeating Example 1 in every material detail.

EXAMPLE 5

Repeating in every material detail the procedure of Example 1, except that a 30% solution of p-vinylphenyl boronic acid in ethanol is substituted for the bis-(2-chloroethyl) vinyl phosphonate monomer.

Resultant polymer is obtained which increases in weight by 1%.

EXAMPLE 6

The procedure of Example 1 is repeated except that the sodium salt of p-vinyl benzyl sulfonic acid is grafted from a saturated aqueous solution onto polypropylene at the termination of the polymer radiation. Resultant polymer is ultimately treated with hydrochloric acid to obtain the free acid.

EXAMPLE 7

4 parts of powdered polypropylene are intimately admixed with 15 parts of bis-(2-chloroethyl) vinyl phosphonate. The mixture is then subjected to ionizing radiation of one million electron-volt electrons. The so-treated polymer is washed with ethanol whereby traces of unreacted monomer and poly-bis-(2-chloroethyl) vinyl phosphonate are removed and recovered.

The washed polymer is found to increase about 3.0% in weight which indicates that reaction between the polymer and monomer occurs.

The polymers formed in the above examples are particularly valuable adhesives in bonding metal to metal. Adhesion tests are performed by heating cleaned metal test blocks to about 550° F., placing the modified polymers of each example between adjacent surfaces of two blocks and thereafter sandwiching the modified polymer therebetween while maintaining the elevation temperature. This enables the establishment of a smooth coating melted polymer to be deposited on the metal contacting surface. The two blocks are then contacted and pressed together while the resin is sufficiently fluid to form a butt-joint adhesive test sample. The sample blocks are next cooled to room temperature and stored for twenty-four hours before they are tested for tensile rupture in a Baldwin Testing Machine as is substantially described in A.S.T.M., C297–52T.

The results of these tests are recorded in Table I below.

*Table I*

| Modified Polymer | Adhesion Tensile Strength (p.s.i.) | | | |
|---|---|---|---|---|
| | Aluminum to Aluminum | Type of Failure* | Copper to Copper | Type of Failure* |
| Example 1 | 1,200 | C | 1,400 | C |
| Example 2 | 1,200 | C | 1,300 | C |
| Example 3 | 3,000 | C | 3,000 | C |
| Example 4 | 700 | C | 800 | C |
| Example 5 | 1,200 | C | 2,200 | C |
| Example 6 | 1,200 | C | 1,000 | C |
| Example 7 | 1,150 | C | 1,350 | C |
| Untreated Polypropylene | 500 | B | 300 | B |
| Irradiated Polypropylene | 400 | B | 300 | B |
| Untreated Polyethylene | 1,200 | B | 1,300 | B |
| Irraidated Polyethylene | 1,300 | B | 1,600 | B |

*B=Failure at the Boundary.  C=Cohesive Failure.

It is readily apparent from a consideration of the above table that the adhesive properties attributed to the modified polymers of the present invention are superior to the unmodified polymers, untreated or irradiated. Rupture at the boundary of the "adhering" metal surfaces occurs at an undesirable low level. Contrariwise, the rupture of integrally bound metal surfaces, as expressed by a cohesive failure, is achieved at a high, commercially desirable level.

We claim:

An adhesionable, moldable, extrudable vinyl-modified polypropylene, said vinyl group being bis-(2-chloroethyl) vinyl phosphonate grafted thereon and wherein the vinyl-modified polypropylene being increased in weight of from about one percent to about twenty percent.

References Cited in the file of this patent

UNITED STATES PATENTS

| 2,837,496 | Vandenberg | June 3, 1958 |
| 2,907,675 | Gaylord | Oct. 6, 1959 |

FOREIGN PATENTS

| 801,528 | Great Britain | Sept. 17, 1958 |

OTHER REFERENCES

"Jour. Polymer Science," vol. XXIII, pages 903–910 cited, 1957, Chin et al.

"Technology of Adhesives," by Delmonte, Reinhold Publishing Co., pages 337–339 cited, 1947.